United States Patent [19]

Graf et al.

[11] Patent Number: 5,582,381
[45] Date of Patent: Dec. 10, 1996

[54] MEANS FOR GUIDING RAILS LONGITUDINALLY FREE OF PLAY

[75] Inventors: Werner Graf, Engen; Simon Frank, Tengen; Karl Baumann, Hilzingen, all of Germany

[73] Assignee: Alusuisse Technology & Management Ltd., Switzerland

[21] Appl. No.: 441,202

[22] Filed: May 15, 1995

[30] Foreign Application Priority Data

May 31, 1994 [CH] Switzerland ............ 01-684/94

[51] Int. Cl.⁶ .................................................. F16M 13/00
[52] U.S. Cl. ............................................................ 248/430
[58] Field of Search .................................. 248/480, 429, 248/424, 420, 419; 296/65.1; 384/47

[56] References Cited

U.S. PATENT DOCUMENTS

| | | | |
|---|---|---|---|
| 3,926,397 | 12/1975 | Hunwicks | 248/430 |
| 4,533,107 | 8/1985 | Okazaki et al. | 248/430 |
| 4,602,758 | 7/1986 | Mann et al. | 248/430 |
| 5,137,244 | 8/1992 | Negi | 248/430 |
| 5,183,234 | 2/1993 | Saito | 248/430 |
| 5,192,045 | 3/1993 | Yamada et al. | 248/430 |
| 5,222,814 | 6/1993 | Boelryk | 384/47 |
| 5,447,352 | 9/1995 | Ito et al. | 248/424 X |

FOREIGN PATENT DOCUMENTS

| | | |
|---|---|---|
| 0524053 | 1/1993 | European Pat. Off. . |
| 2338159 | 12/1977 | France . |
| 2567463 | 1/1986 | France . |
| 2606339 | 5/1988 | France . |

OTHER PUBLICATIONS

Patent Abstract of Japan, vol. 11, No. 272, dated Sep. 4, 1987 for Japanese Patent No. 62074730.

*Primary Examiner*—Ramon O. Ramirez
*Attorney, Agent, or Firm*—Bachman & LaPointe, P.C.

[57] ABSTRACT

Play-free longitudinal guiding means having rails than run inside each other, namely a lower rail and an upper rail that can be displaced in a sliding manner with respect to the lower rail, for securing seats in vehicles such as private cars. The play-free longitudinal guiding means is such that the lower rail features along its length wall parts that have the shape of alignment grooves, and the upper rail features wall parts which run parallel to the wall parts of the lower rail and are shaped into an alignment groove, and the alignment grooves of the upper and lower rails face each other and form a sliding alignment channel. In the sliding channel there are sliding elements which in the free-standing condition exhibit a larger cross-section than in the installed condition, and the sliding elements guide the lower and upper rails without any play.

11 Claims, 2 Drawing Sheets

MEANS FOR GUIDING RAILS LONGITUDINALLY FREE OF PLAY

BACKGROUND OF THE INVENTION

The present invention relates to a means for guiding rails longitudinally comprising rails that fit together and can be displaced in a sliding manner with respect to each other without play, having a lower rail and a sliding displaceable upper rail; the invention relates also to the use of the play-free longitudinal guiding means.

Means of longitudinally guiding two displaceable sliding rails that fit into each other are known for example for sliding movement of equipment or devices. Such longitudinal guiding means are of great importance as longitudinal adjustment devices in the seats of vehicles, for example in automotive vehicles. Guiding means for longitudinal adjustment devices in vehicle seats where the said device comprises rails that fit together, at least one of which exhibits a shaped section with an approximately U-shaped cross-sectional profile, are known e.g. from the German patent document DE 31 22 124. One of the rails is a stationary guide rail and the sliding rail is displaceable in the longitudinal direction via roller-type parts. Additionally, spheres running in longitudinal struts form at least two further longitudinal guiding means.

Known from European Patent EP 0 130 275 are longitudinal guiding means intended in particular for vehicle seats, where two mutually displaceable longitudinal sliding rails fit together, are connected to each other and are in contact with each other under tension via two rows of roller-type parts, in particular spheres.

In practice, two versions of longitudinal guiding means for sliding, mutually displaceable vehicle seats have proved successful. For mechanically displaceable vehicle seats, longitudinal guiding means with some play that permits easy gliding has proved itself. Rails that mate together without play and can be moved only with high expenditure of energy have come into use for the version powered by electromotor drive. The large amount of force required can easily be provided by the electrical drive, and the absence of play, means that undesirable noises are avoided when the vehicle is in use. Longitudinal guiding means with little room for play tend to create disturbing noises while the vehicle is running, and give the impression of inferior construction.

SUMMARY OF THE INVENTION

The object of the present invention is to propose longitudinal guiding means in which there is no play, comprising a lower rail and an upper rail that can be displaced in a sliding manner with respect to the lower rail, and such that the longitudinal guiding means built into a vehicle remains free of noise both under load and not under load during the use of the vehicle.

This objective is achieved by way of the invention in that the lower rail features longitudinal wall parts which are shaped into an alignment groove, and the upper rail features wall parts which run parallel to the wall parts of the lower rail and are shaped into an alignment groove, and the alignment grooves of the upper and lower rails face each other and form a sliding alignment channel, and provided in the sliding alignment channel there are sliding elements which exhibit a larger cross-section in the free-standing condition than in the installed condition, and the sliding elements guide the lower rail and the upper rail without play,

BRIEF DESCRIPTION OF THE DRAWINGS

The following figures show by way of example a version of a longitudinal guiding means according to the present invention and examples of sliding elements.

DETAILED DESCRIPTION OF PREFERRED EMBODIMENTS

Figure 1:
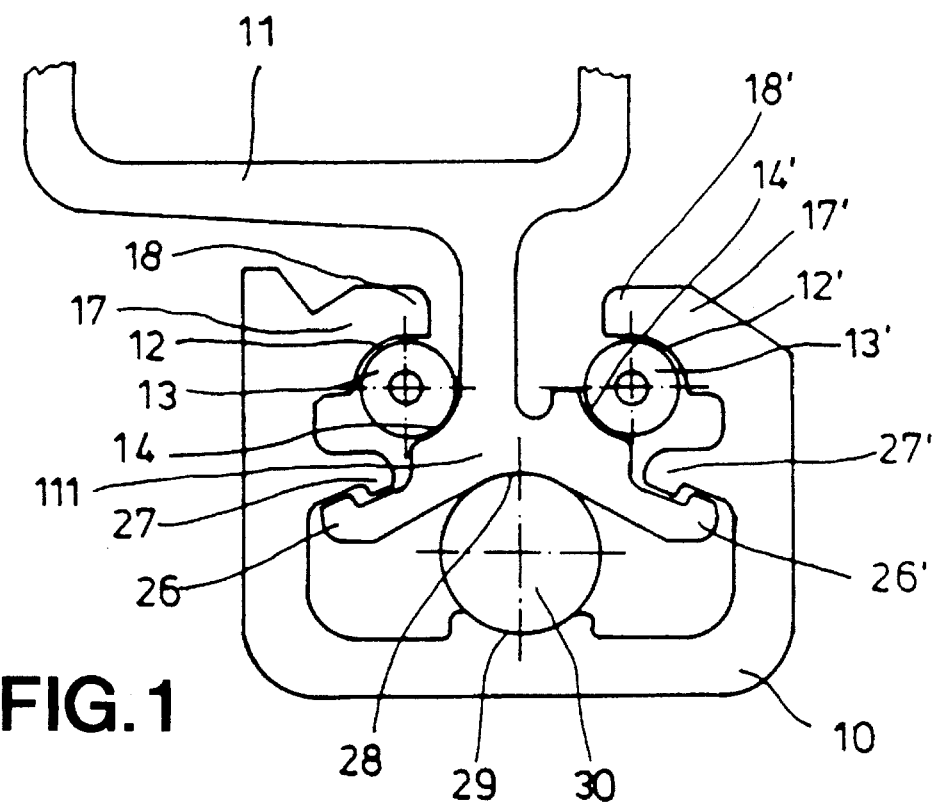
FIG. 1 shows a cross-section through a longitudinal guiding means of upper and lower rails.

The play-fi-ee longitudinal guiding means according to the present invention may for example exhibit a lower rail with a rectangular to square outer profile as viewed in cross-section, which is engaged at the top and side by a U-shaped upper rail. The lower rail may e.g. also be U-shaped and an upper rail with rectangular to square cross-section may be arranged in the U-shaped cross-section. In another version both the upper and lower rails may exhibit a U-shaped cross-section and both rails may be fitted into each other. The cross-section of the upper rail may also be that of a Y or T standing on its head, and the head of the Y or T fitted into the C-shaped cross-section of the lower rail The cross-section of the lower and upper rails may also be essentially triangular in shape, the lower rail forming a groove in which the upper rail is guided.

In the guiding means according to the invention the sliding elements are capable of fulfilling the task of supporting and guiding the rails alone. The upper rail and the component with load attached to the upper rail are supported alone by the lower rail via the sliding elements. The sliding elements take over the function of providing guiding without play and the load-bearing function. The sliding elements can take over only the play-free guiding of the upper and lower rails, while the rollers take over the load-bearing function. Furthermore, it is possible for the rollers to take over a part of the load-bearing function and the sliding elements to take over the guiding function and the rest of the load-bearing function.

In one possible version the lower rail has a C-shaped cross-section, the longitudinal slit of the lower rail being directed upwards and being delimited by two inward projecting ridges. The upper rail with e.g. an essentially rectangular or U-shaped cross-section is arranged in the lower rail with C-shaped cross-section. The two ridges of the lower rail project therefore over the edge regions of the upper rail. This version has the advantage that with increasing tensile load the upper rail is brought up to the ridges of the lower rail and when under load, the upper rail rests against the ridges of the lower rail and serves as a safety lever. This is of great importance if the vehicle should crash; a lifting, tensile force is created by the thrusting force of the passenger via the safety belts and by the thrusting force of the seat itself. The cross-sections of the upper and lower rails described above enable a high degree of safety to achieved using simple section shapes. With this version the wall parts may be parts of the sidewalls of the upper and lower rails. The opposite lying sidewalls of the upper and lower rails form a pair of sidewalls. The alignment grooves may be provided on the inside of both sidewalls of the lower rail and on the outside of both walls of the upper rail, in each case one facing the other and running the length of the rails. The alignment grooves form e.g. two sliding alignment channels i.e. a channel at each pair of sidewalls. It is also possible e.g. to provide two or more sliding alignment channels at one or both pairs of sidewalls. At least one alignment groove pair may also form at least one sliding channel between the bases of the lower and upper rails. The sliding elements which provide the load-bearing and guiding function are situated in the sliding alignment channels. Each sliding alignment and each upper rail may, for example, be provided with two, three, or four sliding elements.

In another possible version the lower rail exhibits a C-shaped cross-section, the longitudinal slit being delimited by two inward projecting ridges. The upper rail may be an extruded section which features an essentially Y-shaped flange, the inverted head of which is situated inside the C-shaped cross-section of the lower rail. Parts of both arms of the Y-shaped flange and the lower faces of both inward projecting ridges or shoulder regions of the upper rail may be selected as the wall parts that are shaped to form facing grooves. This arrangement results in two upper sliding alignment channels that accommodate the sliding elements. Between the arms of the Y-shaped flange and opposite in the lower rail, a track may be formed and accommodate rolling devices such as e.g. balls or rolls or, instead of the track, a further alignment groove may be provided between the arms of the Y-shaped flanges and the floor of the lower rail. The lower pair of grooves then form a lower, third sliding alignment channel which again accommodates sliding elements. Situated in the upper alignment channel are the sliding elements that perform e.g. an alignment function, while in the lower alignment channel there are sliding elements that perform a load-beating or a load-bearing and an alignment function. There may be two, three or four sliding elements per alignment channel and upper rail.

It is possible to exchange the described longitudinal guiding means with respect to upper and lower rails.

The guiding means is formed by the alignment grooves of the upper rail and the alignment grooves of the lower rail and together exhibit a round or prismatic cross-section. The alignment grooves may be clad with high strength materials such as e.g. metallic layers, ceramic layers and the like that may be inserted, vapour deposited, or sprayed on by means of a high temperature process. One advantage of the present longitudinal alignment means is that as a rule one may dispense with high strength materials. The alignment grooves may also be clad or treated with materials having low coefficients of friction.

Free-standing, i.e. before installation, the sliding elements situated in the guiding means exhibit a larger cross-section with reference to their longitudinal axis, than after installation.

Such sliding elements may e.g. feature two or more e.g. three or four cylindrical bodies, in particular such having the same diameter, that are connected via their ends to spring elements. Free-standing, the cylindrical bodies exhibit individual longitudinal axis. The diameter of the cylindrical bodies usefully correspond to the diameter of the alignment groove or the length of the side of the prismatic cross-section.

After installation, the force of the spring elements has to be overcome and the longitudinal axes of the cylindrical bodies lie essentially on the same axis, held in the alignment channels of the upper and lower rails. Because of the permanent spring action of the spring elements, the individual cylindrical bodies are pressed against each other and against the walls of the alignment grooves.

Instead of cylindrical bodies, ball-shaped or cone-shaped bodies may be suitable sliding elements, or in the case of guiding means of prismatic cross-section, corresponding polygonal bodies.

Other kinds of sliding elements are e.g. shaped bodies in the form of helical springs. Apart from the sliding bodies, balls may be provided as a further mode of mutual support for the upper and lower rails in the alignment grooves.

Preferred sliding elements are cylindrical sliding bodies connected to spring elements. Sliding elements that have proved to be particularly advantageous comprise e.g. three, four or five cylindrical bodies that are connected via two, three, or four spring elements. The spring elements may be e.g. spiral or helical springs. Preferred sliding elements are monolithic plastic bodies with the plastic material forming the spring elements between the cylindrical bodies. In the manufacture of such sliding elements and in the free-standing condition, the individual cylindrical sliding bodies are arranged spaced apart on displaced longitudinal axes and, between the individual cylindrical sliding bodies, linking elements are provided on a central axis in the form of spring elements, for example cylindrical in shape and smaller in diameter than the cylindrical bodies. Such sliding elements may be manufactured readily and simply as monolithic bodies e.g. by spraying or injection molding, or may be manufactured from blanks using chip-forming methods.

The sliding elements may be made from materials such as plastics or metals or combinations of materials. Examples of plastics are thermoplastics, preference being given to polymers having hereto-atoms in the main chain. Examples thereof are polyamides, linear poly-carbonates, (polyurethanes), linear polyesters, polycarbonates, polyoxymethylene (polyacetate), polyethers and mixtures thereof. Preferred are e.g. polyamides and polyoxymethylene. The plastic materials may be reinforced with fibers, fleeces or weaves.

Examples of metals are ferrous and non-ferrous metals such as steel, brass, aluminum etc., whereby the surfaces may feature e.g. layers of chromium, bronze or the like.

The sliding elements may contain, on the surface or in the bulk of the body, dry lubricants such as e.g. polytetrafluorethylene (Teflon), graphite, molybdenum disulphide or boron nitride.

Further sliding elements, for example made of plastics, may be compressible sliding bodies that are e.g. barrel shaped. The cross-section of such sliding bodies may be round to oval and along the length feature one, two or more barrel-shaped bulges. Hollow spaces or slit shaped openings may be provided, especially in the region of the barrel-shaped thickening of compressible bodies. In the free-standing state the hollow spaces or openings may be splayed open and, after installation closed somewhat as a result of the elasticity of the sliding body.

The force of the spring acts accordingly sideways with reference to the longitudinal axis, and in particular in all planes. The force of the spring action is such that the sliding elements take up the play between the upper and lower rails and the sliding elements between them, thus ensuring a fit without any play.

All sliding elements may be smeared with lubricants such as dry lubricants, such as Teflon, graphite, molybdenum disulphide, boron nitride or oils, greases or pastes that are partially or completely synthetic or of mineralogical base. The lubricants may also contain high pressure additives or other additives. The sliding elements may exhibit, on their surface or throughout, recesses, degrees of roughness, pockets and the like which hold a reserve amount of lubricant.

The sliding elements may be arranged in the sliding alignment channels between the upper and lower rails, there being usefully two, three or four, if desired more than four, sliding elements in each channel. As a rule the sliding elements are attached to the upper rails i.e. the rails attached e.g. to the vehicle seat. The attachment of the sliding elements may be made via clamps, screws, rivets, pins and the like. If there is more than one upper rail present, then usefully two, three or four sliding elements are provided per sliding alignment channel.

The longitudinal guiding means according to the invention makes it possible to mount the vehicle seat such that it can be shifted e.g. via the lower rail mounted on the floor of the vehicle and the upper rail attached to the seat. Usefully each moveable seat is provided with two pairs of rails, normally mounted in the region of the sideways limits of the seat. The rails may have a length e.g. of 0.3 to 0.6 m.

With the longitudinal guiding means according to the invention it is also possible to provide relatively long lower rails e.g. having a length of 0.5 to 1.5 m and to fit to these lower rails more than one upper rail e.g. two upper rails. The upper rails may have a length e.g. of 0.3 to 0.6 m. This way it becomes possible to provide two or three rows of moveable seats in vehicles. This version may e.g. be employed preferentially in small buses or large limousines, vans and the like. The unavoidable bending of rails that are e.g. <0.5 m in length and under load does not lead to clamping of the upper and lower rails. Consequently, the vehicle seat can be easily adjusted manually, also under load.

In practice the vehicle seats with upper rails mounted on them are introduced, sledge-like, into the lower rails under a slight degree of tension. By means of the sliding elements, the number of which can be varied, the pressure per unit area can be kept low. Because of their point loading characteristic, this is not possible using balls. Consequently, it is possible to dispense with high strength cladding materials also in the region of the alignment grooves, and possibly also with separate roller bodies; and the alignment grooves are subject to hardly any wear. In the version according to the invention the upper and lower rails usefully do not come into contact with each other and the dimensional tolerances between the upper and lower rails are fully taken up by the spring action of the sliding elements so that a bearing free of play is provided both when the rails are under load or not.

In particular, the lower and/or the upper rails may be made of aluminum or its alloys, extruded sections being particularly of interest in that case.

The releasable arrest, which sliding of upper and lower rails makes possible, may be achieved using customary devices such as cogging, arresting recesses, projections and the like.

The present invention relates also to seat mounting means containing the play-free longitudinal guiding means. The play-free longitudinal guiding means is especially suitable for securing seats to the floor or walls, especially in road-bound vehicles such as private cars, large limousines, small buses, touring buses or omnibuses or in aircraft.

In FIG. 1 one can recognize an essentially C-shaped section which forms the lower rail 10. The lower rail 10 may be mounted e.g. to a vehicle floor or a part of the vehicle floor, for example by means of bolts, rivets, adhesives and the like. Shown in the hollow space inside the C-shaped section 10 is the upper rail 11 in the form of a U-section with a Y-shaped flange 111. In the region of the inward projecting ridges 18, 18' and the shoulders 17, 17' of the lower rail 10 are alignment grooves 12, 12' and, facing these, alignment grooves 14, 14' on the arms of the Y-shaped flange 111 of the upper rail. The alignment grooves 12, 12' and 14, 14' complement each other to create two sliding alignment channels that are round in cross-section. Situated in the sliding alignment channels are sliding elements 13, 13'. For example, provision may be made for three or four sliding elements per alignment groove, these being distributed along the length of the upper rail 11; i.e. the upper rail 11 slides on six or eight sliding elements 13, 13' in the lower rails 10. The lower rails 10 in the form of a C-shaped section and the upper rails 11 in the form of a section with a Y-shaped flange 111 are preferably made of aluminum or its alloys. The arms of the Y-shaped flange usefully feature at their ends a bulge 26, 26' that is hook-shaped in cross-section. The C-section of the lower rail 10 usefully features on its inner sidewalls projections 27, 27' with a hook-shaped cross section. Under normal operating conditions the bulges 26, 26' and the sidewall projections 27, 27' slide past each other a small distance apart. Under increasing tensile load, such as can occur e.g. when braking hard, the hook-shaped part of the projections 27, 27' clamp onto the bulges 26, 26' and reliably prevent the upper rail 11 from being pulled out of the lower rail. 10. The tipper rail 11 may likewise be e.g. an extruded section of aluminum or its alloys. This may also be in the form of a U-section or a hollow bridge die section. The alignment grooves 12, 12', 14, 14' may if desired feature surfaces that have been hardened and/or pretreated with lubricant. A further alignment groove is arms of the Y-shaped flange 111 and a track 29 on the base of the lower rail 10. Sliding elements 30 and/or roller-type bodies may be provided in this alignment groove e.g. balls or, on appropriately modifying the alignment grooves, also rollers.

Figure 2:
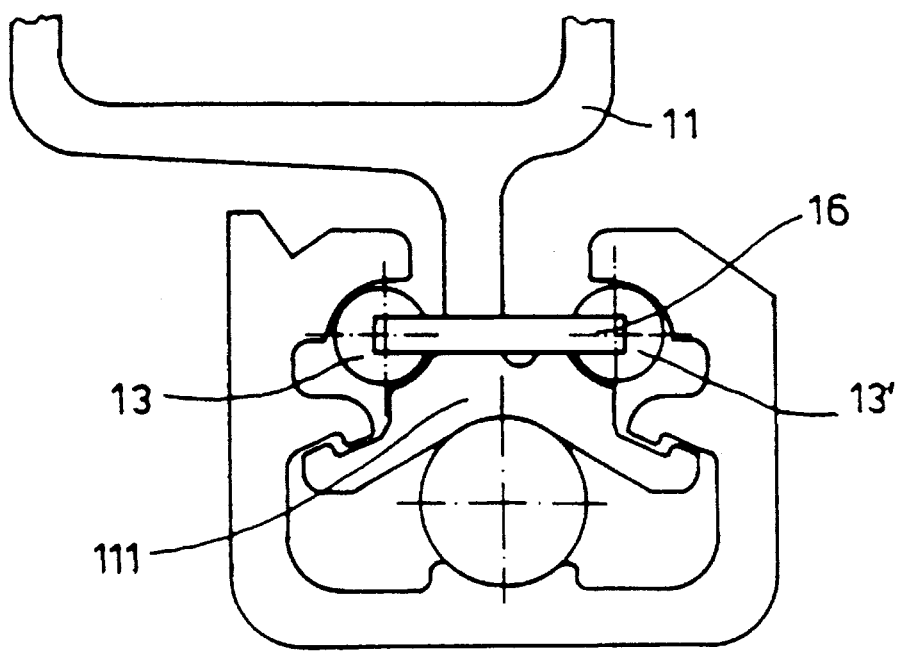
FIG. 2 shows a cross-section through a longitudinal guiding means of upper and lower rails having additional features.

FIG. 2 shows a section through a longitudinal guiding means according to the present invention and, as already shown in FIG. 1, however with reference to the length of the said guiding means, at another location. At this location can be seen a pin 16 which is attached to the Y-shaped flange 11 of the upper rail and holds the sliding elements 13 and 13' to the upper rail 11.

Figure 3B:
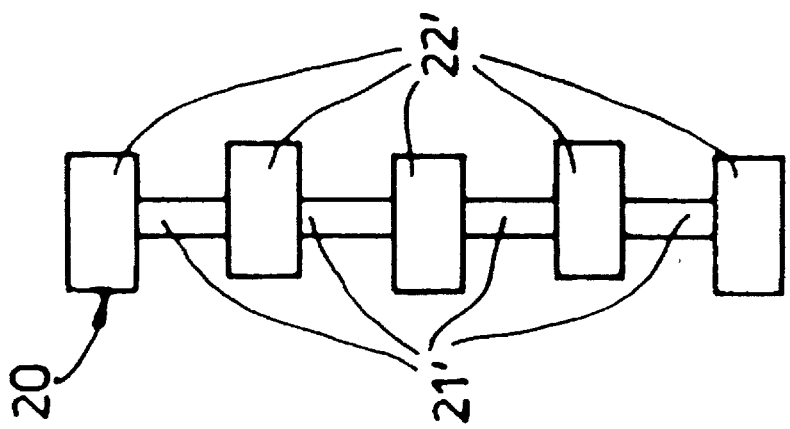
Figure 3A:
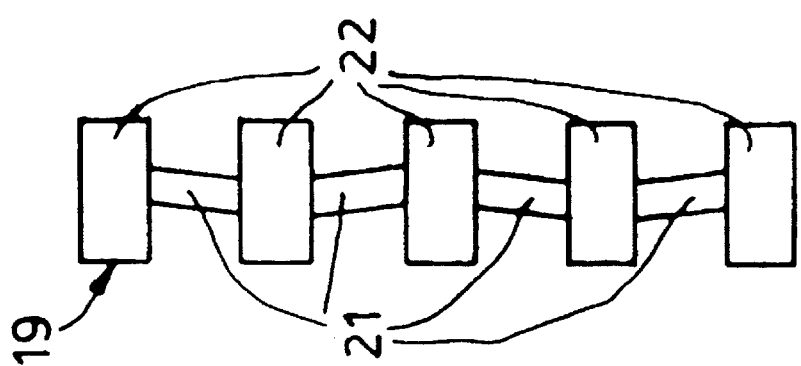

Shown in FIG. 3a) is a cross-sectional view and a plan view of a sliding element in the installed position 19. A plurality of cylindrical sliding bodies 22, here by way of example five, are joined together by spring components or struts 21. In the installed position all of the cylindrical sliding bodies are arranged on the same axis in order that they fit into one of the alignment channels. Consequently, the spring components or struts 21 are subjected to a deforming force. FIG. 3b) shows the sliding elements of FIG. 3a) in the free-standing condition 20. i.e. the elastic force of the spring components or struts 21' has been equalized out, but the cylindrical bodies 22' are arranged on different parallel axes. It can be seen that as soon as a force is applied to the spring components, as a force at an angle to the spring components, the sliding bodies in the alignment channels are under tension with respect to each other and the alignment grooves and the upper rail is held in the lower rail without any play. Tolerances and play between the upper and lower rails are equalized out by the elastic force in each sliding element. The sliding elements according to FIGS. 3a) and 3b) may be for example injection moldings or injection formed parts made of plastic. The injection mold produces a shape as shown in FIG. 3b), i.e. a sliding element in the free-standing condition. On installation into the alignment grooves, the struts 21, 21' act as springs and twist the cylindrical bodies 22, 22' with respect to each other and in particular with respect to both sets of alignment grooves 12, 12', 14 and 14'. Lubricants such as grease may be introduced in the region of the struts 21, 21'. After installation in the sliding alignment grooves, this cushion of grease enables minute amounts of lubricant to be distributed continuously in the alignment grooves thus ensuring that the rails slide inside each other without any difficulty.

Figure 4B:
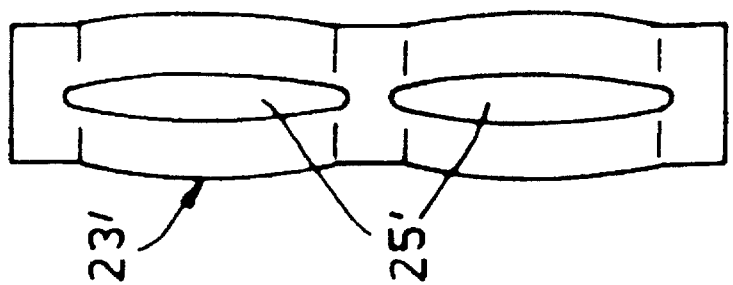
FIGS. 3a and 3b and 4a and 4b show various sliding elements in cross-section and in plan view, in each case in the free-standing state.
Figure 4A:
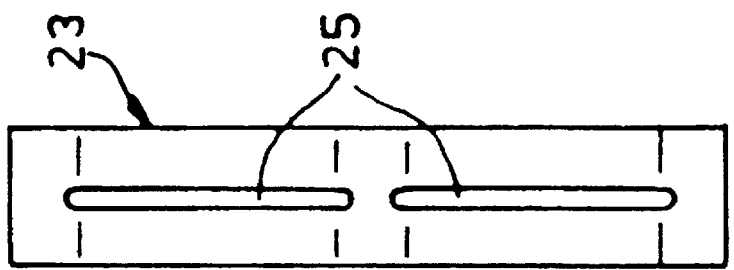

FIG. 4 shows a sliding element of a slightly different kind. The sliding body in the installed position 23 in FIG. 4a) is cylindrical in shape and features e.g. two slit-like hollow spaces 25. The cross-section in the installed condition (not shown here) may be e.g. round or slightly oval.

In the free-standing condition the sliding body 23' according to FIG. 4a) is barrel-shaped, as shown in FIG. 4b). The hollow spaces 25' have increased in size due to the elasticity of the material of the sliding body 23, 23'. In cross-section the sliding body 23' has a more oval shape due to the widening of the hollow spaces 25' Consequently, in the installed condition the hollow spaces 25' are compressed and form the narrower spaces 25. The hollow spaces 25, 25' may, if desired, be at least partly filled with a lubricant.

Relatively strong material may be usefully selected for the sliding bodies 23, 23'. Such materials are e.g. rubber, hard rubber or other thermoplastics mentioned above.

The sliding elements may be for example 4 to 25 mm in diameter, preferably 5 to 20 mm, in the as-installed condition. In the free-standing condition the cross-section may increase by 10 to 30%. The length of a sliding element may be for example 20 to 80 mm, preferably 30 to 50 mm. The length of an individual sliding element 22, as with a spring component 21, may be for example 3 to 10 mm. The lower rail may as mentioned above, have a length of up to 1.5 m. preferably 0.4 to 1.3 m, whereas the upper rail may have a length of 0.3 to 0.6 m. The clear width of a lower rail, for example a C or U-shaped section may be 35 to 50 mm and the greatest width of an upper rail lies as a rule at about 2 to 4 mm less than the clear width of the lower rail, i.e. a gap of 1 to 2 mm can be maintained between the sidewalls.

The play-free longitudinal guiding means according to the present invention is easily capable of equalising out the manufacturing tolerances that have an effect in particular on the assembly of the upper and lower rails. It is therefore possible to accept relatively large manufacturing tolerances in the upper and lower rails, as these large manufacturing tolerances can be readily equalised out by the sliding elements. The large manufacturing tolerances permitted with the upper and lower rails lead to reduced manufacturing costs and simplify both the assembly of the upper and lower rails and the installation of the longitudinal alignment means in the vehicle body.

We claim:

1. Play-free longitudinal guiding means comprising rails that run inside each other, including a lower rail and an upper rail that can be displaced in a sliding manner with respect to the lower rail, with the lower rail featuring longitudinal wall parts which are shaped into an alignment groove, and the upper rail featuring wall parts which run parallel to the wall parts of the lower rail and are shaped into an alignment groove, wherein the lower and upper rail alignment grooves face each other and form a sliding alignment channel, and sliding elements having a free-standing condition and an installed condition and situated in the sliding alignment channel, wherein said sliding elements exhibit a larger cross-section in the free-standing condition than in the installed condition, and wherein the sliding elements guide the lower rail and the upper rail without play.

2. Longitudinal guiding means according to claim 1, wherein the sliding elements alone achieve the task of supporting and guiding the upper and lower rails.

3. Longitudinal guiding means according to claim 1, wherein sliding alignment channel is made up of the alignment grooves of the upper rail and the lower rail and is round or prismatic in cross-section.

4. Longitudinal guiding means according to claim 1, wherein, as a result of elastic stresses, the sliding elements have a larger cross-section in the free-standing condition than in the installed condition.

5. Longitudinal guiding means according to claim 1, wherein the sliding elements comprise a plurality of sliding bodies that are joined together in a springy manner.

6. Longitudinal guiding means according to claim 1, wherein the sliding elements comprise compressible sliding bodies.

7. Longitudinal guiding means according to claim 1, wherein the lower rail exhibits a C-shaped cross-section.

8. Longitudinal guiding means according to claim 7, wherein the upper rail exhibits a Y-shaped cross-section.

9. Longitudinal guiding means according to claim 1, wherein the lower rail and the upper rail each exhibit two alignment grooves which form two sliding alignment channels and the sliding elements are arranged in these channels.

10. Longitudinal guiding means according to claim 1, wherein the lower rail and the upper rail each exhibit three alignment grooves which form two sliding alignment channels and a track or three sliding alignment channels and the sliding elements are arranged in these channels.

11. Longitudinal guiding means according to claim 1, wherein at least one of the lower rail and the upper rail are extruded sections.

* * * * *